US012763706B2

(12) United States Patent
Brunel et al.

(10) Patent No.: US 12,763,706 B2
(45) Date of Patent: Oct. 13, 2026

(54) SYSTEM FOR COMMANDING AND BRAKING AN ARTICULATED MOBILE ELEMENT OF AN AIRCRAFT

(71) Applicant: AIRBUS OPERATIONS SAS, Toulouse (FR)

(72) Inventors: Luc Brunel, Toulouse (FR); Thierry Immordino, Toulouse (FR); Stéphane Warnet, Toulouse (FR); Florent Crebassol, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 221 days.

(21) Appl. No.: 18/662,528

(22) Filed: May 13, 2024

(65) Prior Publication Data

US 2024/0421730 A1 Dec. 19, 2024

(30) Foreign Application Priority Data

Jun. 19, 2023 (FR) ....................................... 2306272

(51) Int. Cl.
*H02P 3/06* (2006.01)
*B64C 13/50* (2006.01)

(52) U.S. Cl.
CPC ................ *H02P 3/06* (2013.01); *B64C 13/50* (2013.01)

(58) Field of Classification Search
CPC .................................. H02P 3/06; B64C 13/05
See application file for complete search history.

(56) References Cited

U.S. PATENT DOCUMENTS

| | | | |
|---|---|---|---|
| 8,614,555 B2 | 12/2013 | Sheahan, Jr. et al. | |
| 10,703,462 B2 | 7/2020 | Harrington et al. | |
| 2012/0013176 A1 | 1/2012 | Shepard et al. | |
| 2013/0234679 A1* | 9/2013 | De Wergifosse | H02P 9/46 322/47 |
| 2020/0271061 A1* | 8/2020 | Kopeschka | F02D 45/00 |
| 2022/0380064 A1* | 12/2022 | Alecu | B64C 25/001 |

OTHER PUBLICATIONS

Jan. 17, 2024 Search Report issued in French Patent Application No. 2306272.

* cited by examiner

*Primary Examiner* — Zoheb S Imtiaz
(74) *Attorney, Agent, or Firm* — Williams Mullen; R. Brian Drozd

(57) ABSTRACT

A command system of an aircraft mobile element actuated by a motor is provided. The command system is electrically connected to a power supply, to the motor and to a current consuming device used to effect de-icing. The system establishes a connection between the motor and the current consuming device and inhibits a first connection between the power supply and the motor and a second connection between the power supply and the current consuming device when a braking command is received. The system enables the first connection and the second connection to be established and inhibits the third connection as long as no braking command has been received or when a command to stop braking is received. Thus the mobile element can be easily braked and the overall size of the system is limited.

9 Claims, 6 Drawing Sheets

Fig. 1
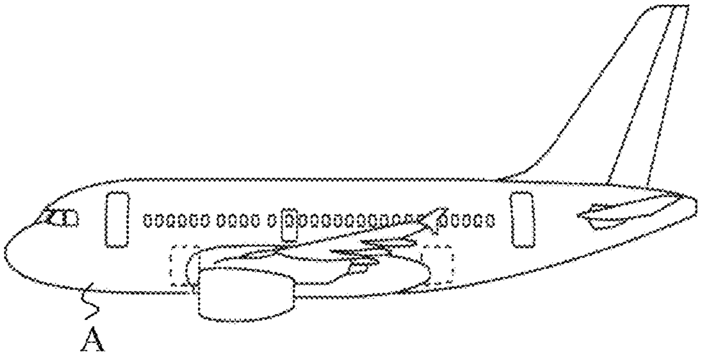
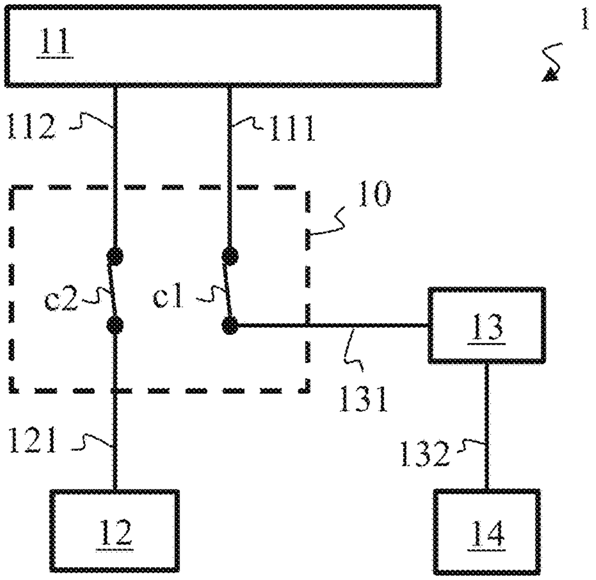
Fig. 2A
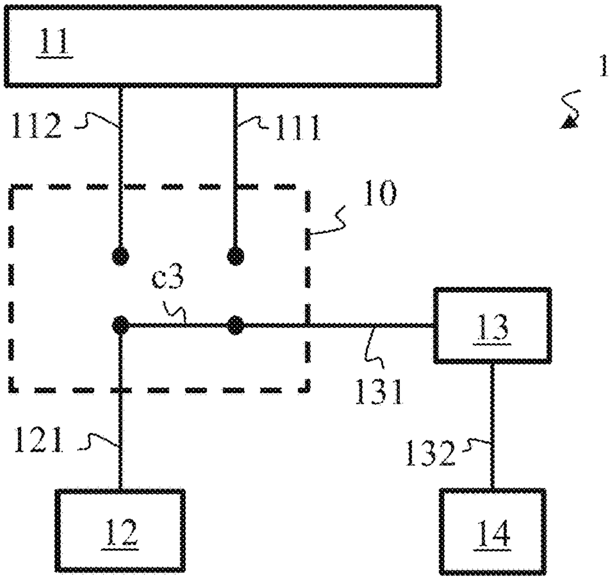
Fig. 2B

SYSTEM FOR COMMANDING AND BRAKING AN ARTICULATED MOBILE ELEMENT OF AN AIRCRAFT

TECHNICAL FIELD

The present invention concerns the field of articulated mobile elements of aircraft and more particularly concerns a command system configured to brake an articulated mobile element of an aircraft.

PRIOR ART

Aircraft include articulated mobile elements that can be moved and oriented in order to act on the thrust, speed, lift or attitude of the aircraft or for example to deploy rolling elements of the aircraft. An articulated mobile element is generally controlled by an articulated mobile element electric motor supplying a mechanical torque to the articulated mobile element in order to move it.

However, because of its mass and its speed, the articulated mobile element may generate a mechanical torque that is transmitted to the articulated mobile element motor. The articulated mobile element motor then begins to function as a generator. In this case the movement of the articulated mobile element is no longer controlled by the articulated mobile element motor but depends on mass and speed parameters. It is then necessary to brake such movement to prevent the speed of the articulated mobile element damaging the articulated mobile element or elements surrounding the mobile element such as a stop for retaining the articulated mobile element or a structure supporting such a retaining stop. Further, it is desirable to provide a solution that is both compact and light in weight.

STATEMENT OF INVENTION

Here there is proposed a system for commanding and braking an articulated mobile element, the articulated mobile element being actuated by an articulated mobile element electric motor, called motor. The command system is configured to receive commands for braking the articulated mobile element, called braking commands, and commands to stop braking the articulated mobile element. The command system is electrically connected to an electrical power supply, to the motor and to an electrical current consuming device. The command system includes electrical or electronic circuitry configured to enable a first electrical connection to be established between the electrical power supply and the motor, to enable a second electrical connection to be established between the electrical power supply and the electrical current consuming device and to inhibit a third electrical connection between the motor and the electrical current consuming device as long as no braking command is received and when a command to stop braking the articulated mobile element is received. The command system includes electrical or electronic circuitry configured to inhibit the first electrical connection between the electrical power supply and the motor, to inhibit the second electrical connection between the electrical power supply and the electrical current consuming device, and to establish the third electrical connection between the motor and the electric current consuming device when a braking command is received. The electrical current consuming device is further used to effect de-icing when the electrical current consuming device is supplied with electrical energy.

It is therefore easy to brake the movement of the articulated mobile element thanks to the consumption by the electrical current consuming device of electrical energy supplied by the motor and therefore by limiting the electrical current supplied by the motor, which enables a resisting torque to be created. Further, the overall size, cost and masses are optimised since the electrical current consuming device is not dedicated uniquely to braking the articulated mobile element but is used for de-icing when the articulated mobile element does not need to be braked.

In accordance with one particular embodiment the command system further includes a first switching device and a second switching device, the first switching device being electrically connected to the second switching device by an electrical connection, called intermediate connection. The first switching device is electrically connected to the electrical power supply, to the motor and to the intermediate connection, the second switching device is electrically connected to the electrical power supply, to the electrical current consuming device, and to the intermediate connection. The first switching device is configured to inhibit an electrical connection between the motor and the intermediate connection as long as no braking command is received and when a command to stop braking is received. The first switching device is configured to establish an electrical connection between the motor and the intermediate connection when a braking command is received. The second switching device is configured to establish an electrical connection between the electrical current consuming device and the intermediate connection when a braking command is received.

In accordance with one particular embodiment the first switching device is configured to establish the electrical connection between the motor and the intermediate connection when a braking command is received and further when information representing an absence of electrical connection between the electrical power supply and the electrical current consuming device is received. The second switching device is configured to send information representing an absence of electrical connection between the electrical power supply and the electrical current consuming device as soon as the electrical connection between the electrical power supply and the electrical current consuming device is inhibited.

There is also proposed here a control system including the command system in accordance with any of its embodiments and further including an electrical power supply, an articulated mobile element electric motor, an articulated mobile element and an electrical current consuming device.

There is also proposed here an aircraft including any of the embodiments of the command system.

There is also proposed here a method of commanding an articulated mobile element executed by a command system of an articulated mobile element, the articulated mobile element being actuated by an articulated mobile element electric motor, called motor. The command system is electrically connected to an electrical power supply, to the motor, and to an electrical resistance. The electrical current consuming device is used to effect de-icing when the electrical current consuming device is electrically powered. The command system is configured to receive commands for braking the articulated element, called braking commands, and for stopping braking of the articulated mobile element. The method including:

enabling a first electrical connection to be established between the electrical power supply and the motor, enabling a second electrical connection to be established between the electrical power supply and the electrical current consuming device, and a inhibiting third electrical connection between the motor and the electrical current consuming device as long as no braking command has been received and when a command to stop braking the articulated mobile element is received, inhibiting the first electrical connection between the electrical power supply and the motor, inhibiting the second electrical connection between the electrical power supply and the electrical current consuming device, and establishing the third electrical connection between the motor and the electrical current consuming device when a braking command is received.

In accordance with one particular embodiment the command system includes a first switching device and a second switching device, the first switching device being electrically connected to the second switching device by an electrical connection, called intermediate connection, the first switching device being electrically connected to the electrical power supply, to the motor and to the intermediate connection, the second switching device being electrically connected to the electrical power supply, to the electrical current consuming device, and to the intermediate connection. The method further includes:

inhibiting an electrical connection between the motor and the intermediate connection as long as no braking command has been received and when a command to stop braking is received, establishing the electrical connection between the motor and the intermediate connection when a braking command is received, establishing an electrical connection between the electrical current consuming device and the intermediate connection when a braking command is received.

There is also proposed here a computer program that can be stored in a medium and/or downloaded from a communication network in order to be read by a processor. This computer program comprises comprising program code instructions for execution of any embodiment of the above method when said program is executed by the processor. The invention also concerns an information storage medium for storing such a computer program.

BRIEF DESCRIPTION OF THE DRAWINGS

The features of the invention mentioned hereinabove and others will become more clearly apparent on reading the following description of at least one embodiment, said description being given with reference to the appended drawings, in which:

FIG. 1 depicts diagrammatically an aircraft that includes a command system of an articulated mobile element;

FIG. 2A depicts diagrammatically the command system of an articulated mobile element in accordance with a first embodiment when the command system is in a first connection state;

FIG. 2B depicts diagrammatically the command system of an articulated mobile element in accordance with a first embodiment when the command system is in a second connection state;

DETAILED DESCRIPTION OF EMBODIMENTS

Figure 3A:
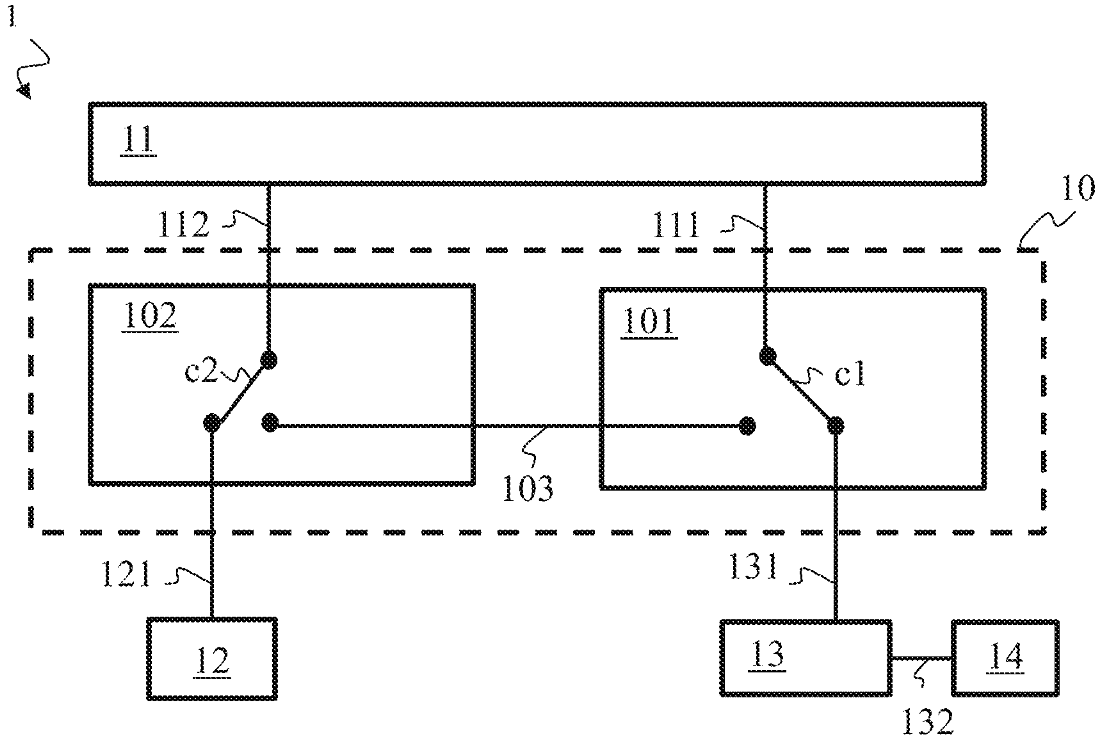
FIG. 3A depicts diagrammatically the command system of an articulated mobile element in accordance with a second embodiment when the command system is in the first connection state.

FIG. 1 depicts diagrammatically an aircraft A that includes a system 10 for commanding (as represented in FIG. 2A) and braking (as represented in FIG. 2A) an articulated mobile element 14 of the aircraft A.

The articulated mobile element 14 of the aircraft A is for example a wing element of the aircraft A such as a part of a wing or of a tail assembly of the aircraft A, for example a vertical stabiliser or a horizontal stabiliser. The articulated mobile element 14 may in particular be an aileron, a flap, a high-lift device or a spoiler. In one embodiment the articulated mobile element 14 is a thrust reverser which, when deployed, redirects toward the front of the aircraft A a flow of air generated by a propulsion engine of the aircraft A. This enables strong deceleration of the aircraft A, for example after landing. On the other hand, in other flight phases it is necessary for the thrust reverser to be folded down in order for the flow of air generated by the propulsion engine to be directed toward the rear and therefore to enable the aircraft A to accelerate, to move forward and to maintain its altitude. In one embodiment the articulated mobile element 14 is a landing gear the deployment of which is necessary during a phase of taxiing, taking off or landing the aircraft A, the landing gear having on the other hand to be retracted when the aircraft A is in flight. In one embodiment the articulated mobile element 14 is a wheel or a set of wheels driven in rotation to enable the aircraft A to circulate on the ground.

The movement of the articulated mobile element 14 is controlled by an electric motor 13, also called motor 13, (represented in FIG. 2A) of the articulated mobile element 14 that supplies mechanical energy to the articulated mobile element 14. The articulated mobile element 14 is able to move in two opposite directions and enables a plurality of positions to be reached. Each position of the plurality of positions is between two extreme positions such as a retracted position and a deployed position. When the articulated mobile element 14 is a wheel, the articulated mobile element 14 has no extreme position but moves in rotation in two opposite rotation directions.

In one example the aircraft A further includes a control for actuating the articulated mobile element 14 enabling a pilot to send instructions for moving the articulated mobile element 14. In another example instructions for moving the articulated mobile element 14 are sent by an automatic control device requiring no action by the pilot.

The aircraft A includes an avionic system configured to receive and to process instructions for moving the articulated mobile element 14 coming for example from the actuation control. The avionic system is configured to transmit to the motor 13, for example via the command system 10, commands for moving the articulated mobile element 14 in accordance with movement instructions received and taking account of safety conditions.

The avionic system is further configured to transmit to the command system 10 commands for braking the articulated mobile element 14, called braking commands, when the movement of the articulated mobile element 14 generates a mechanical torque because of the effect of its mass and its speed. The braking command opposes the movement of the articulated mobile element 14 controlled by the motor 13. A braking command is therefore distinguished from a movement command because the movement command is aimed at acting on the speed of the articulated mobile element 14 by an electrical power supply injecting a greater or lesser quantity of electrical current into the motor 13 so as to act on the speed of the motor 13. A braking command is to the contrary intended to control the speed of the articulated mobile element 14 by controlling the consumption by a current consuming device of the quantity of electrical current generated by the motor 13. A braking command controls the articulated mobile element 14 by controlling the electrical current that is supplied by the motor 13 functioning as a generator because of the effect of a mechanical torque generated by the movement of the articulated mobile element. Here braking the articulated mobile element 14 is to be interpreted as slowing, maintaining a constant speed or accelerating for as long as the speed of the articulated mobile element 14 resulting from braking remains lower than the speed of the articulated mobile element 14 without braking. In other words, when a braking command is transmitted to the command system 10 the electrical energy sent to the motor 13 and consumed opposes movement of the articulated mobile element 14.

A braking command can therefore be sent by the avionic system after a command to move the articulated mobile element 14. In one example the avionic system transmits a braking command when a condition applying to the speed or the position of the articulated mobile element 14 is reached, for example by comparing a speed or a position detected by a sensor to a predefined speed or position threshold.

The avionic system is further configured to transmit to the command system 10 a command to stop braking the articulated mobile element 14 when the mobile articulated element 14 no longer needs to be braked, in other words when movement of the articulated mobile element 14 is again controllable by the electrically-powered motor 13. A command to stop braking the articulated mobile element is sent for example when the speed of the articulated mobile element 14 is again below the predefined speed threshold or when the electrical power delivered by the motor 13 functioning as a generator is less than a predefined power.

FIG. 2A depicts diagrammatically the command system 10 of the articulated mobile element 14 in accordance with a first embodiment.

The command system 10 is implemented in a control system 1 including an electrical power supply 11, the articulated mobile element 14 and the electric motor 13 of the articulated mobile element 14. The articulated mobile element 14 is actuated by the motor 13 which supplies mechanical energy via a mechanical link 132.

The control system 1 further includes an electrical current consuming device 12 configured to consume an electrical current. The electrical current consuming device 12 includes for example at least one electrical resistance and/or at least one piezoelectric component. The electrical current consuming device 12 enables a de-icing function to be exercised, for example, by producing heat by thermal dissipation, in order to provide protection against the formation of ice. The de-icing function makes it possible for example to avoid disturbance of an aerodynamic flow in the case of de-icing external surfaces of the aircraft A, to ensure good visibility in the case of de-icing a windshield, or to ensure reliable acquisition of data in the case of de-icing sensors. To provide the de-icing function the electrical current consuming device 12 must be electrically powered. The electrical current consuming device 12 can form part of a de-icing system of the aircraft A including a plurality of de-icing electrical devices.

The control system 1 includes a first electrical power supply connection 111 electrically connecting the electrical power supply 11 to the command system 10, a second electrical power supply connection 112 electrically connecting the electrical power supply 11 to the command system 10, an electrical connection 131 electrically connecting the command system 10 to the motor 13, and an electrical connection 121 electrically connecting the command system 10 to the electrical current consuming device 12. Each electrical connection enables current to circulate between two elements that it connects.

The command system 10 is configured to establish connections c1, c2, c3 (the connection c3 being depicted in FIG. 2B), in other words to make connections, and to inhibit the connections c1, c2, c3, in other words to effect disconnections, in order to electrically connect and disconnect the electrical power supply 11 and the motor 13, the electrical power supply 11 and the electrical current consuming device 12, and the motor 13 and the electrical current consuming device 12. The electrical power supply 11 and the motor 13 can be electrically connected by establishing a first connection c1 between the first electrical power supply connection 111 and the electrical connection 131. The electrical current supply 11 and the electrical current consuming device 12 can be electrically connected by establishing a second connection c2 between the second electrical power supply connection 112 and the electrical connection 121. The motor 13 may be electrically connected to the electrical current consuming device 12 by establishing a third connection c3 between the electrical connection 121 and the electrical connection 131.

The command system 10 is further configured to communicate with the avionic system in order to receive commands to brake and commands to stop braking the articulated mobile element 14.

The same electrical current consuming device 12 advantageously and cleverly enables use of a de-icing function and a function of braking the articulated mobile element 14. The electrical consuming device 12 enables the de-icing function to be used when said electrical current consuming device 12 is electrically powered, for example by the electrical connection 11. Further, the electrical current consuming device 12 enables the function for braking the articulated mobile element 14 to be used when said electrical current consuming device 12 is electrically connected to the motor 13 and consumes the electrical energy that is generated by the motor 13 because of a mechanical torque transmitted by the articulated mobile element 14.

The command system 10 has two connection states. A first connection state depicted in FIG. 2A enables a function of movement of the articulated mobile element 14 to be exercised by electrically powering the motor 13 by the electrical power supply 11 in a selective manner and further enables the current consuming device 12 to exercise the de-icing function. A second connection state depicted in FIG. 2B enables the current consuming device 12 to exercise the function for braking the articulated mobile element 14.

FIG. 2A represents the command system 10 in the first connection state.

The first connection state of the command system 10 enables selective movement of the articulated mobile element 14, for example to deploy it or to retract it, while enabling the electrical current consuming device 12 to exercise the de-icing function. The command system 10 is in the first connection state when no braking command is received and when a command to stop braking the articulated mobile element 14 is received by the command system 10 from the avionic system.

In the first connection state the command system 10 enables the first connection c1 to be established in order to connect electrically the motor 13 and the electrical power supply 11.

Thus the motor 13 can supply mechanical energy to the articulated mobile element 14 in order to move it. In one embodiment the first connection c1 is established in a stable manner and there further exists a device for selective electrical connection of the motor 13 to the electrical power supply 11 as a function of additional conditions specific to the movement of the articulated mobile element 14, called movement conditions. Alternatively, the first connection c1 is selectively established as a function of said movement conditions. Thus the electrical connection between the motor 13 and the electrical power supply 11 is permitted but further depends on movement conditions of the articulated mobile element 14. Said movement conditions determine for example the speed and rotation direction of the motor 13.

Further, in the first connection state the command system 10 enables the second connection c2 to be established in order to enable an electrical connection between the electrical current consuming device 12 and the electrical power supply 11. The electrical current consuming device 12 is therefore able to exercise the de-icing function. In one embodiment the second connection c2 is established in a stable manner and there further exists a device for selective electrical connection of the electrical current consuming device 12 to the electrical power supply 11 as a function of additional conditions specific to the de-icing function, called de-icing conditions. Alternatively the second connection c2 is selectively established as a function of said de-icing conditions. Thus the electrical connection between the electrical current consuming device 12 and the electrical power supply 11 is permitted but may further depend on de-icing conditions.

In the first connection state the command system 10 further prevents any connection between the motor 13 and the electrical current consuming device 12. The third connection c3 is therefore necessarily inhibited.

FIG. 2B depicts diagrammatically the command system of an articulated mobile element 14 in accordance with the first embodiment when the command system 10 is in the second connection state.

The second connection state of the command system 10 enables braking of the articulated mobile element 14. In the second connection state the de-icing function exercised by the current consuming device 12 is potentially degraded.

The command system 10 goes to the second connection state when a command for braking the articulated mobile element 14 is received by the command system 10 from the avionic system. The command system 10 establishes the third connection c3 in order to connect electrically the motor 13 to the electrical current consuming device 12. Thus the electrical energy supplied by the motor 13 is consumed by the electrical current consuming device 12 and transformed into heat, which enables braking of movement of the articulated mobile element 14 and therefore prevents damage to the articulated mobile element 14 and elements surrounding the articulated mobile element 14.

Further, the command system 10 prevents any connection between the electrical power supply 11 and the motor 13. The first connection c1 is therefore necessarily inhibited (i.e. cut off or absent). The second connection c2 is further inhibited in order to prevent any electrical connection between the electrical power supply 11 and the motor 13 via the second electrical power supply connection 112.

When the command system 10 is in the second connection state the electrical current consuming device 12 is not electrically powered by the electrical power supply 11, which leads to potential degradation of the de-icing function. However, the electrical current consuming device 12 being electrically powered by the motor 13 functioning as a generator, the de-icing function may be at least partially exercised by the electrical current consuming device 12, using the electrical energy supplied by the motor 13 functioning as a generator.

When the de-icing system of the aircraft A includes a plurality of electrical de-icing devices the de-icing system can enable some of the plurality of electrical de-icing devices to exercise the de-icing function whereas others of the plurality of electrical de-icing devices are used to brake the articulated mobile element 14. Thus the de-icing function need not be adversely changed during braking of the articulated mobile element 14.

When the articulated mobile element 14 is a thrust reverser the braking of the articulated mobile element 14 occurs after a landing phase, when the aircraft A is on the ground. The de-icing function is therefore not indispensable for the correct operation and for the safety of the aircraft A. Further, the articulated mobile element 14 is braked for a sufficiently short time for any reduction of the performance of the de-icing function to be acceptable in terms of the safety and the operation of the aircraft A.

FIG. 3A depicts diagrammatically the control system 10 of an articulated mobile element 14 in accordance a second embodiment when the command system 10 is in the first connection state.

In the second embodiment the command system 10 includes a first switching device 101 and a second switching device 102. The first switching device 101 is electrically connected to the second switching device 102 by a so-called intermediate electrical connection 103, also called intermediate connection 103.

Further, each of the first and second switching devices 101, 102 is configured to communicate with the command system 10 or the avionic system of the aircraft A in order to receive commands for braking and stopping braking of the articulated mobile element 14. The first and second switching devices 101, 102 can further be configured to communicate with one another.

The first switching device 101 is electrically connected to the electrical power supply 11 by the first electrical power supply connection 111 and electrically connected to the motor 13 by the electrical connection 131.

The second switching device 102 is electrically connected to the electrical power supply 11 by the second electrical power supply connection 112 and electrically connected to the electrical current consuming device 12 by the electrical connection 121.

When the command system 10 of the second embodiment is in the first connection state the first switching device 101 enables stable or selective establishing of the first connection c1 between the first electrical power supply connection 111 and the electrical connection 131, depending on movement conditions. Thus the motor 13 is electrically powered selectively in order to control the movement of the articulated mobile element 14. Further, the second switching device 102 enables stable or selective establishing of the second connection c2 between the second electrical power supply connection 112 and the electrical connection 121, depending on de-icing conditions, enabling the supply of electrical energy to the electrical current consuming device 12 by the electrical power supply 11. Thus the electrical current consuming device 12 is able to exercise the de-icing function.

Figure 3B:
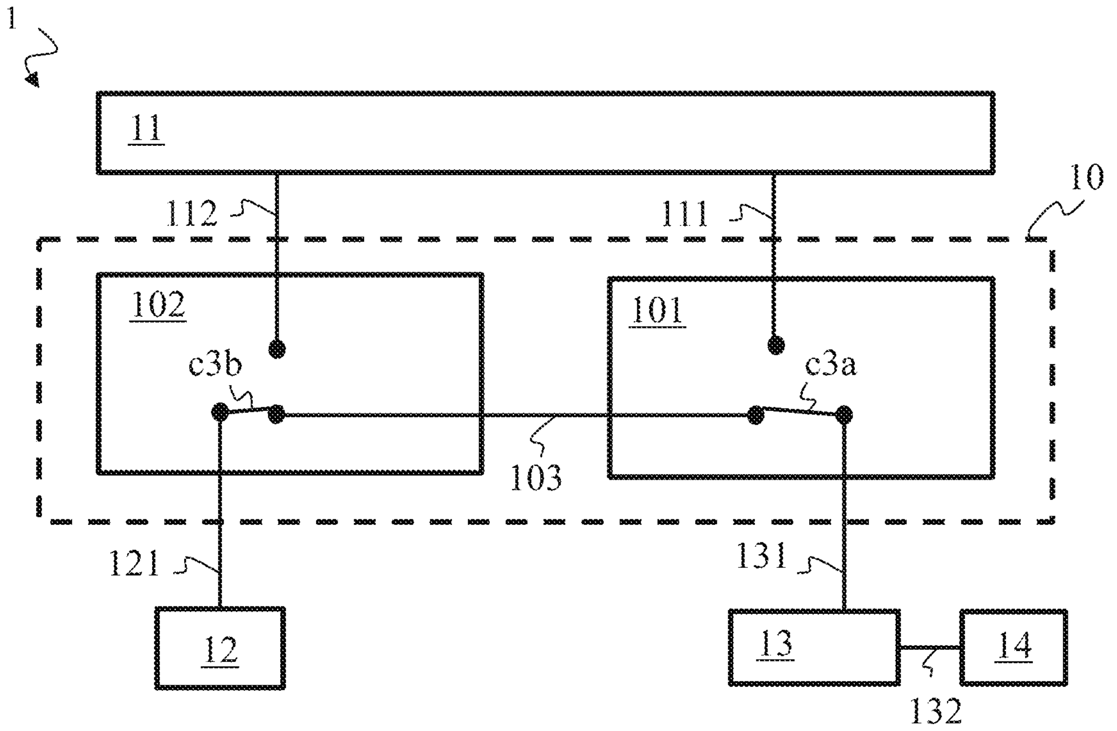
FIG. 3B depicts diagrammatically the command system of an articulated mobile element in accordance with a second embodiment when the command system is in the second connection state.

FIG. 3B depicts diagrammatically the control system 10 of an articulated mobile element 14 in accordance with the second embodiment when the command system 10 is in the second connection state.

When the command system 10 of the second embodiment is in the second connection state the first switching device 101 establishes a fourth connection c3$a$ between the electrical connection 131 and the intermediate connection 103. Further, the second switching device 102 establishes a fifth connection c3$b$ between the intermediate connection 103 and the electrical connection 121. Thus the combination of the fourth and fifth connections c3$a$, c3$b$ enables electrical connection of the motor 113 to the electrical current consuming device 112.

As in the first embodiment of the command system 10, in the second connection state the first connection c1 and the second connection c2 are necessarily inhibited.

In an alternative embodiment the second switching device 102 includes a permanent electrical connection between the intermediate connection 103 and the electrical current consuming device 12. In other words, the fifth connection c3$b$ is always present.

Figure 4:
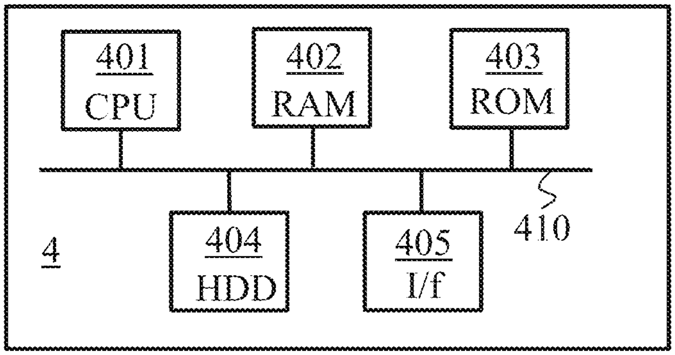
FIG. 4 depicts diagrammatically an example of a hardware platform suitable for implementing the command system.

FIG. 4 depicts diagrammatically an example of a hardware platform enabling implementation in electronic circuitry form of a control unit of the command system 10.

The hardware platform includes, connected by a communication bus 410: a processor or central processing unit (CPU) 401, a random access memory (RAM) 402, a read only memory (ROM) 403 or electrically-erasable programmable ROM (EEPROM), such as a Flash memory, a storage unit such as a hard disk drive (HDD) 404, or a storage medium reader such as a secure digital (SD) card reader, and an interface manager I/f 405.

The interface manager I/f 405 enables the control unit to interact with the avionic system of the aircraft A and with the first and second switching devices 101, 102 if necessary.

The processor 401 is able to exercise instructions loaded into the random access memory 402 from the read only memory 403, an external memory, a storage medium (such as an SD card), or a communication network. When the hardware platform is powered up the processor 401 is able to read instructions from the random access memory 402 and to execute them. These instructions form a computer program causing execution by the processor 401 of some or all of the steps, processes and operations described here with reference to the command system 10.

Some or all of the steps, methods and functions described here can therefore be implemented in software form by execution of a set of instructions by a programmable machine, for example a digital signal processor (DSP) or a microcontroller, or in hardware form by a dedicated machine or electronic component (chip) or a dedicated set of electronic components (chipset), for example a field programmable gate array (FPGA) component or application specific integrated circuit (ASIC) component. Generally speaking, the command system 10 includes electronic circuitry adapted and configured to exercise the processes and steps described here.

In accordance with the second embodiment of the command system 10 the first switching device 101 and respectively the second switching device 102 include a control unit implemented in the form of electronic circuitry by a hardware platform similar to that depicted in FIG. 4.

The interface manager I/f 405 of the control unit of the first switching device 101 enables said control unit to interact with the avionic system of the aircraft A and/or with the command system 10 and with the second switching device 102 if necessary.

The interface manager I/f 405 of the control unit of the second switching device 102 enables said control unit to interact with the avionic system of the aircraft A and/or with the command system 10 and with the first switching device 101 if necessary.

Generally speaking the first switching device 101, respectively the second switching device 102, includes electronic circuitry adapted and configured to exercise the processes and steps described here with reference to the first switching device 101, respectively the second switching device 102.

Figure 5:
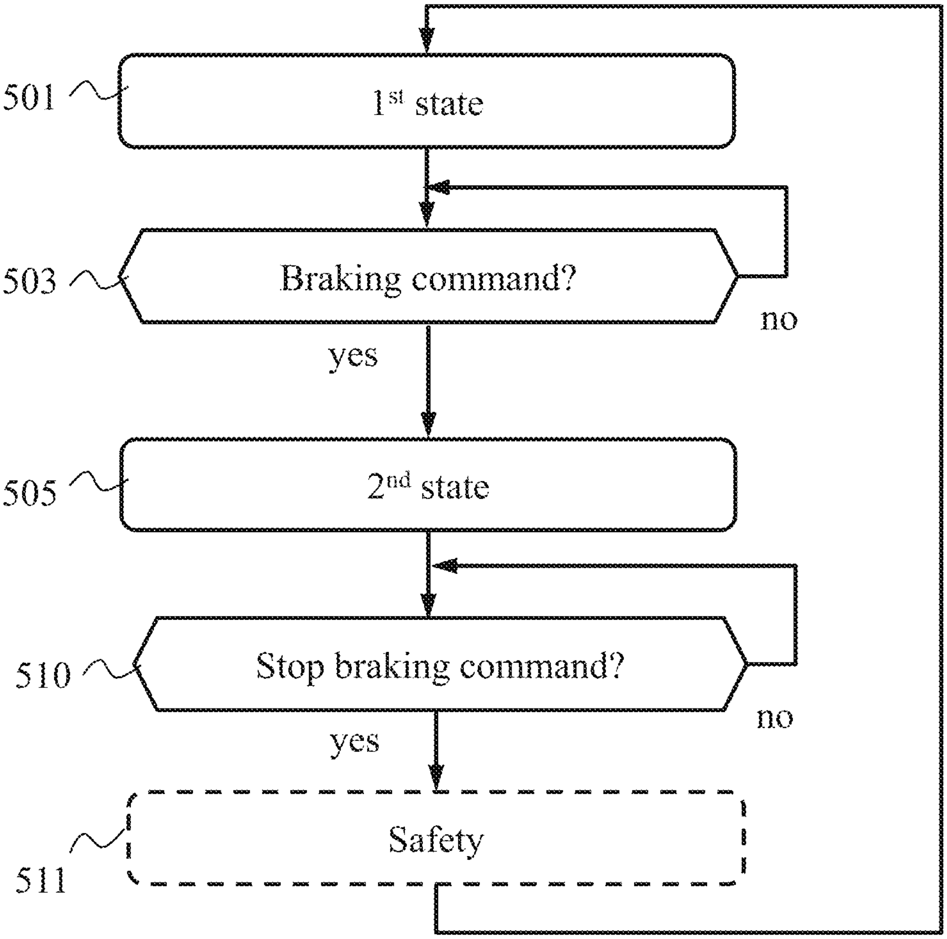
FIG. 5 depicts diagrammatically a command method of the articulated mobile element implemented by the command system of the articulated mobile element.

FIG. 5 depicts diagrammatically a method for commanding the articulated mobile element 14 implemented by the command system 10.

In a first step 501 the command system 10 is in the first connection state. Establishing the first connection c1 is permitted in order to allow supply of electrical power to the motor 13 to control the movement of the articulated mobile element 14. Further, establishing the second connection c2 is permitted in order to enable the electrical current consuming device 12 to exercise its de-icing function. Further, the third connection c3 is inhibited. The inhibition of the third connection c3 is thereafter maintained until the command system 10 exits the first connection state.

In a subsequent step 503 the command system 10 determines if a braking command has been received by the command system 10 from the avionic system. If so a step 505 is executed. If not the command system 10 remains in step 503.

In step 505 the command system 10 goes from the first connection state to the second connection state. The first and second connections c1, c2 are inhibited in order to prevent supply of electrical energy to the motor 13. Further, the third connection c3 is established in order to connect electrically the electrical current consuming device 12 to the motor 13.

Inhibiting the first and second connections c1, c2 and establishing the third connection c3 then continue until the command system 10 returns to the first connection state.

Figure 6A:
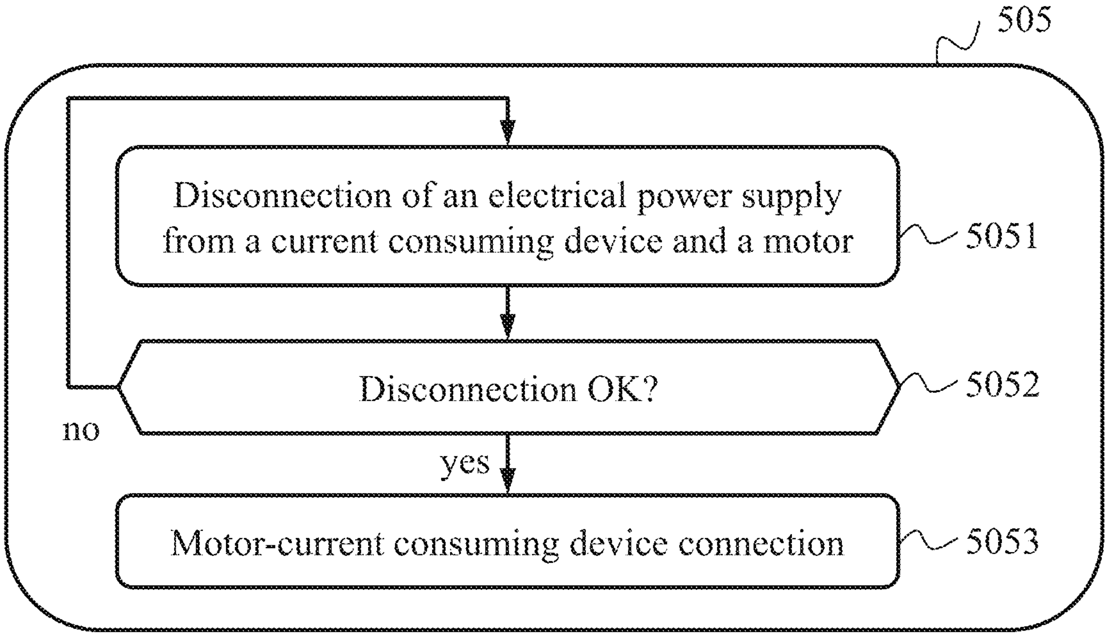
FIG. 6A depicts diagrammatically a step of the method for commanding the articulated mobile element implemented by the command system of the articulated mobile element.

One particular implementation of step 505 is depicted in FIG. 6A. In a first step 5051 the command system 10 inhibits the first connection c1 and the second connection c2. In a subsequent step 5052 the command system 10 verifies that the second connection c2 has actually been inhibited. For example, the command system 10 effects an electrical test by measuring a current passing through the electrical connection 121 and determining that the second connection c2 is inhibited if the measured current is below a predefined threshold. In accordance with one particular embodiment the command system 10 further verifies that the first connection c1 is inhibited. As soon as the second connection c2 is inhibited the command system 10 goes to a step 5053. Otherwise the command system 10 returns to step 5051, or alternatively remains in step 5052 in order to await inhibition of the second connection c2.

In step 5053 the command system 10 establishes the third connection c3.

Thus the motor 13 cannot be supplied with electrical energy via the second electrical power supply connection 112 on going from the first connection state to the second connection state.

In accordance with one embodiment the third connection c3 or the intermediate connection 103 includes a diode oriented so as to prevent the flow of current between the electrical power supply 11 and the motor 13 via the second electrical power supply line 112 while enabling circulation of current between the motor 13 and the electrical current consuming device 12. Thus the supply of electrical energy to the motor 13 via the second electrical power supply connection 112 is prevented.

Referring again to FIG. 5, in a subsequent step 510 the command system 10 determines if a command to stop braking the articulated mobile element 14 has been received by the command system 10 from the avionic system. If so the command system 10 optionally goes to a step 511 and then returns to step 501. Otherwise the command system 10 remains in step 510.

Figure 6B:
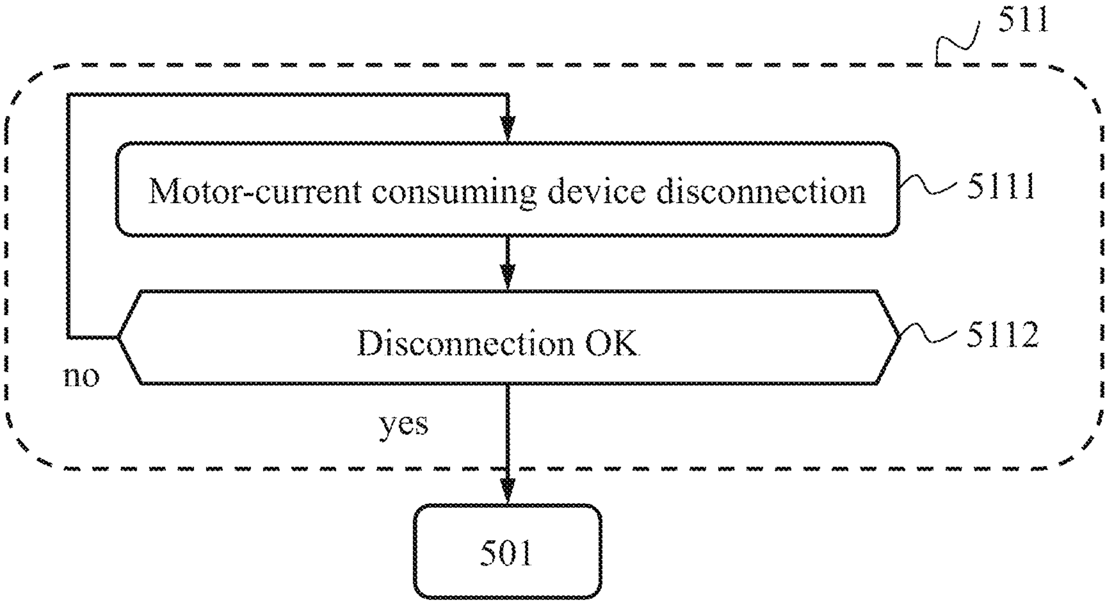
FIG. 6B depicts diagrammatically another step of the method for commanding the articulated mobile element implemented by the command system of the articulated mobile element.

The optional step 511 is depicted in FIG. 6B. In a step 5111 the command system 10 inhibits the third connection c3.

In a subsequent step 5112 the command system 10 verifies that the third connection c3 has actually been inhibited, for example by means of an electrical test. If so the command system 10 goes to step 501 in which establishing the second connection c2 is permitted. If not the command system 10 returns to step 5111 or alternatively remains in step 5112 in order to await disconnection of the third connection c3.

Thus the motor 13 cannot be supplied with electrical energy via the second electrical power supply connection 112. It is therefore guaranteed that the articulated mobile element 14 cannot move in an inappropriate manner, in other words without the avionic system sending a command for movement of the articulated mobile element 14.

Figure 7:
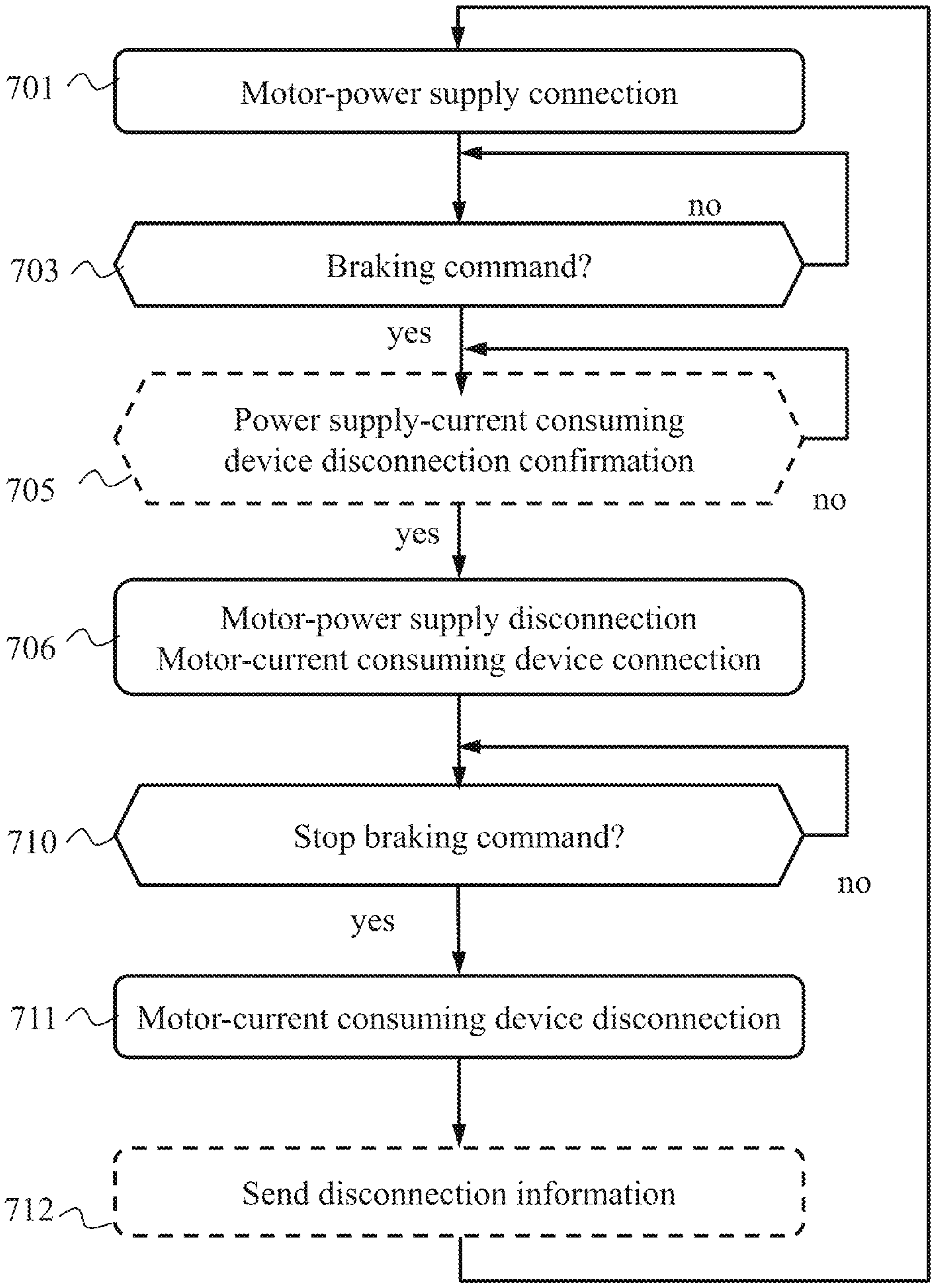
FIG. 7 depicts diagrammatically a method for commanding the articulated mobile element implemented by a first switching device of the command system of the articulated mobile element.

FIG. 7 depicts diagrammatically a method for commanding the articulated mobile element 14 implemented by the first switching device 101 of the command system in accordance with the second embodiment.

In a first step 701 the first switching device 101 is in the first connection state and enables the first connection c1 to be established in order to allow supply of electrical energy to the motor 13. The fourth connection c3*a* is inhibited.

In a subsequent step 703 the first switching device 101 determines if a braking command has been received by the command system 10 from the avionic system. If so an optional step 705 or alternatively a step 706 is executed. If not the first switching device 101 remains in step 703.

Figure 8:
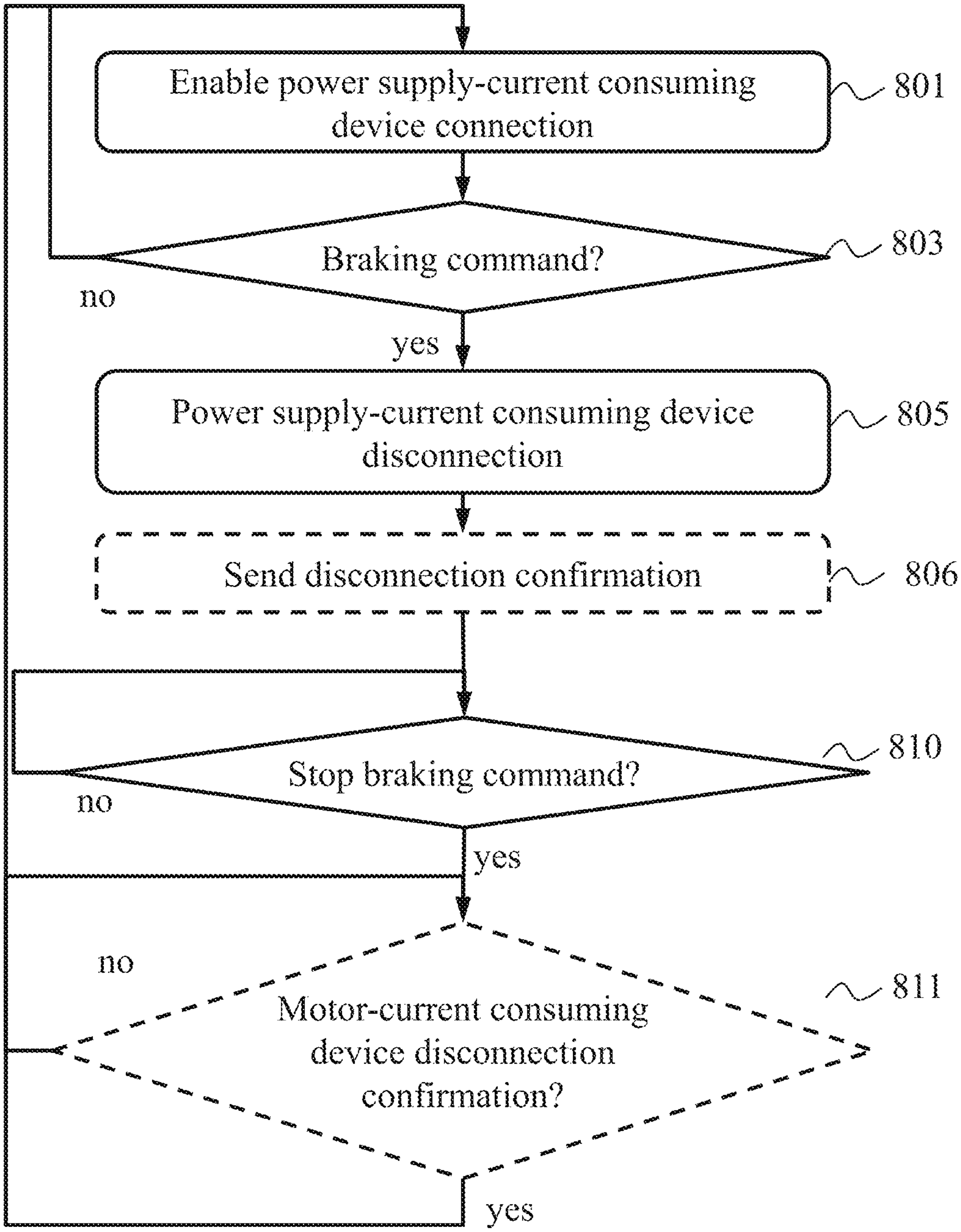
FIG. 8 depicts diagrammatically a method for commanding the articulated mobile element implemented by a second switching device of the command system of the articulated mobile element.

In the optional step 705 the first switching device 101 verifies that the second connection c2 has been inhibited. To this end the first switching device 101 verifies that information representing inhibition of the second connection c2 has been received from the second switching device 102 or from the command system 10. If so step 706 is executed. If not the first switching device 101 remains in step 705. In accordance with one embodiment step 705 is executed by the first switching device 101 when a step 806 depicted in FIG. 8 is executed by the second switching device 102.

In accordance with one embodiment if no information representing disconnection of the second connection c2 has been received the first switching device 101 sends a request for confirmation of inhibition of the second connection c2 to the second switching device 102 and waits to receive the confirmation before going to step 706.

In step 706 the first switching device 101 inhibits the first connection c1 and establishes the fourth connection c3*a* in order to go to the second connection state. The motor 13 is no longer supplied with energy by the electrical power supply 11 and is electrically connected to the electrical current consuming device 12.

In a step 710 the first switching device 101 determines if a command to stop braking the articulated mobile element 14 has been received by the command system 10 from the avionic system. If so a step 711 is executed. If not the first switching device 101 remains in step 710.

In step 711 the first switching device 101 inhibits the fourth connection c3*a* in order to disconnect the motor 13 from the electrical current consuming device 12 and then goes to an optional step 712 before returning to step 701 to go to the first connection state.

In the optional step 712 the first switching device 101 sends information representing inhibition of the fourth connection c3*a* to the second switching device 102 or to the command system 10. In accordance with one particular embodiment, the first switching device 101 first verifies that the fourth connection c3*a* has actually been inhibited, for example by means of an electrical test, and then sends said information. The first switching device 101 then returns to step 701.

FIG. 8 depicts diagrammatically a method for commanding the articulated mobile element 14 implemented by the second switching device 102 of the command system 10.

In a first step 801 the second switching device 102 enables the second connection c2 to be established in order to enable establishing an electrical connection between the electrical power supply 11 and the electrical current consuming device 12 and for the electrical current consuming device 12 to be able to exercise a de-icing function.

In a subsequent step 803 the second switching device 102 determines if a braking command has been received by the command system 10 from the avionic system. If so a step 805 is executed. If not the second switching device 102 returns to step 801 or alternatively remains in step 803 waiting for a braking command to be received.

In step 805 the second switching device 102 inhibits the second connection c2 in order to disconnect the electrical current consuming device 12 from the electrical power supply 11 and thereby to prevent the motor 13 being supplied with electrical energy via the second electrical power supply connection 112. The second switching device 102 also establishes the fifth connection c3*b* if said fifth connection c3*b* is inhibited in order to connect electrically the motor 13 and the electrical current consuming device 12.

In an optional step 806 the second switching device 102 sends information representing inhibition of the second connection c2 to the command system 10 or to the first switching device 101. In accordance with one particular embodiment the second switching device 102 first verifies that the second connection c2 has actually been inhibited, for example by means of an electrical test, and then sends said information.

In a subsequent step 810 the second switching device 102 determines if a command to stop braking the articulated mobile element 14 has been received by the command system 10 from the avionic system. If so the second switching device 102 inhibits the fifth connection c3*b*, when inhibition is possible, and then effects an optional step 811 before returning to step 801. If not the second switching device 102 remains in step 810 and waits to receive a command to stop braking the articulated mobile element 14.

In step 811 the second switching device 102 verifies that information representing inhibition of the fourth connection c3*a* is received from the first switching device 101 or from the command system 10. In accordance with one embodiment said information may be received after execution of step 712 by the first switching device 101. If so the second switching device 102 returns to step 801. If not the second switching device 102 remains in step 801. In accordance with one embodiment if no information representing disconnection of the fourth connection c3*a* has been received the second switching device 102 sends a request for confirmation of inhibition of the fourth connection c3*a* to the first switching device 101 and waits to receive the confirmation before returning to step 801.

The invention claimed is:

1. A system for commanding and braking an articulated mobile element, the articulated mobile element being actuated by an electric motor, called motor, the command system being configured to receive commands for braking the articulated mobile element, called braking commands, and commands to stop braking the articulated mobile element, the command system being electrically connected to an electrical power supply, to the motor and to an electrical current consuming device, the command system includes electrical or electronic circuitry configured to:

enable a first electrical connection to be established between the electrical power supply and said motor, to enable a second electrical connection to be established between said electrical power supply and said electrical current consuming device, and to inhibit a third electrical connection between said motor and said electrical current consuming device as long as no braking command is received and when a command to stop braking the articulated mobile element is received, and inhibit the first electrical connection between the electrical power supply and the motor, to inhibit the second electrical connection between the electrical power supply and the electrical current consuming device, and to establish a third electrical connection between the motor and the electric current consuming device when a braking command is received, wherein the electrical current consuming device of the system is used to effect de-icing of a surface when the electrical current consuming device is supplied with electrical energy.

2. The command system according to claim 1 further including a first switching device and a second switching device, the first switching device being electrically connected to the second switching device by an electrical connection, called intermediate connection, the first switching device being electrically connected to the electrical power supply, to the motor and to the intermediate connection, the second switching device being electrically connected to the electrical power supply, to the electrical current consuming device, and to the intermediate connection, wherein the first switching device is configured to:

inhibit an electrical connection between the motor and the intermediate connection as long as no braking command is received and when a command to stop braking is received, and establish the electrical connection between the motor and the intermediate connection when a braking command is received, and wherein the second switching device is configured to:

establish an electrical connection between the electrical current consuming device and the intermediate connection when a braking command is received.

3. The command system according to claim 2 wherein the first switching device is configured to:

establish the electrical connection between the motor and the intermediate connection when a braking command is received and further when information representing an absence of electrical connection between the electrical power supply and the electrical current consuming device is received, and wherein the second switching device is configured to:

send information representing an absence of electrical connection between the electrical power supply and the electrical current consuming device as soon as the electrical connection between the electrical power supply and the electrical current consuming device is inhibited.

4. A control system including the command system according to claim 1, the control system further including an electrical power supply, an articulated mobile element electric motor, an articulated mobile element and an electrical current consuming device.

5. An aircraft including the command system according to claim 1.

6. A method of commanding an articulated mobile element executed by a command system of an articulated mobile element, the articulated mobile element being actuated by an articulated mobile element electric motor, called motor, the command system being electrically connected to an electrical power supply, to said motor, and to an electrical resistance, the electrical current consuming device being used to effect de-icing a surface when the electrical current consuming device is electrically powered, the command system being configured to receive commands for braking the articulated element, called braking commands, and for stopping braking of the articulated mobile element, the method comprising:

enabling a first electrical connection to be established between the electrical power supply and the motor, enabling a second electrical connection to be established between the electrical power supply and the electrical current consuming device, and a third electrical connection between the motor and the electrical current consuming device to be inhibited as long as no braking command has been received and when a command to stop braking the articulated mobile element is received, inhibiting the first electrical connection between the electrical power supply and the motor, inhibiting the second electrical connection between the electrical power supply and the electrical current consuming device, and establishing the third electrical connection between the motor and the electrical current consuming device when a braking command is received.

7. The method according to claim 6 in which the command system includes a first switching device and a second switching device, the first switching device being electrically connected to the second switching device by an electrical connection, called intermediate connection, the first switching device being electrically connected to the electrical power supply, to said motor and to the intermediate connection, the second switching device being electrically connected to the electrical power supply, to the electrical current consuming device, and to the intermediate connection, and which method further includes:

inhibiting an electrical connection between the motor and the intermediate connection as long as no braking command has been received and when a command to stop braking is received, establishing the electrical connection between the motor and the intermediate connection when a braking command is received, establishing an electrical connection between the electrical current consuming device and the intermediate connection when a braking command is received.

8. A non-transitory storage medium for storing a computer program product comprising program code instructions for execution by a processor of an aircraft articulated mobile element command system of the method according to claim 7 when said instructions are executed by said processor.

9. A non-transitory storage medium for storing a computer program including program code instructions for execution by a processor of an aircraft articulated mobile element command system of the method according to claim 6 when said instructions are executed by said processor.

* * * * *